Sept. 6, 1966 W. C. JOHNSON 3,271,554
OVERLAY WELDING
Filed June 24, 1965 11 Sheets-Sheet 1

INVENTOR.
Wallace C. Johnson
BY
ATTORNEYS

Sept. 6, 1966  W. C. JOHNSON  3,271,554
OVERLAY WELDING

Filed June 24, 1965  11 Sheets-Sheet 2

INVENTOR.
Wallace C. Johnson
BY

ATTORNEYS

Sept. 6, 1966 W. C. JOHNSON 3,271,554
OVERLAY WELDING

Filed June 24, 1965 11 Sheets-Sheet 5

INVENTOR.
Wallace C. Johnson
BY
ATTORNEYS

Fig. 5

INVENTOR.
Wallace C. Johnson
BY
ATTORNEYS

Sept. 6, 1966  W. C. JOHNSON  3,271,554
OVERLAY WELDING

Filed June 24, 1965  11 Sheets-Sheet 7

INVENTOR.
Wallace C. Johnson
BY
ATTORNEYS

Sept. 6, 1966  W. C. JOHNSON  3,271,554
OVERLAY WELDING

Filed June 24, 1965  11 Sheets-Sheet 11

INVENTOR.
Wallace C. Johnson
BY
ATTORNEYS 3,271,554
OVERLAY WELDING
Wallace C. Johnson, St. Davids, Pa., assignor to Arcos Corporation, Philadelphia, Pa., a corporation of Pennsylvania
Filed June 24, 1965, Ser. No. 466,726
22 Claims. (Cl. 219—76)

The present application is a continuation-in-part of my copending application, Serial No. 415,353 filed December 2, 1964, for Overlay Welding, and abandoned.

The present invention relates to electric arc welding methods, apparatus and electrode and barrier strips, particularly suitable for depositing weld overlay on base metal.

A purpose of the invention is to deposit welding overlay at greatly increased deposition rates.

A further purpose is to make weld overlays as thick as a half inch or thicker in a single pass or bead from alloys such as stainless steel or Inconel deposited on a base metal such as plain carbon steel or low alloy steel.

A further purpose is to deposit thin wide single layer weld overlays with dilution from the base metal not exceeding 20% and often not exceeding 10% or even as low as 5%.

A further purpose is to utilize a barrier strip which can be of plain rectangular cross-section and which need not overlap the previous weld bead, with the barrier strip preferably resting flat against the base metal.

A further purpose is to overlay with an electrode and a barrier strip by a method in which the existence of an air gap or space between the barrier strip and the base metal is not critical and to avoid the critical control distances which have previously been encountered in the series arc overlay method.

A further purpose is to provide a flange on the barrier strip either on the side adjoining the previous weld bead or the side remote therefrom.

A further purpose is to use a cold rolled metal barrier strip which will tend to lie flat against the work when it is uncoiled.

A further purpose is to use a strip electrode to arc to the barrier strip and the base metal and to locate the strip electrode overhanging the barrier strip and overhanging the adjoining portion of the previous weld bead so as to obtain good fusion between the new weld bead and the previous weld bead.

A further purpose is to employ a strip electrode which overhangs at both edges of the barrier strip.

A further purpose is to use a strip electrode which is somewhat wider than the barrier strip.

A further purpose is to adjust the overhang of a strip electrode beyond a barrier strip by skewing the strip electrode with respect to the length of the barrier strip so that the edge of the strip electrode which adjoins the previous weld bead can be forward in the direction of progression or rearward in the direction of progression as preferred.

A further purpose is to employ a flux cored strip electrode with a barrier strip, the barrier strip also being desirably flux cored. Either or both of the flux cores will where desired contain alloying elements.

A further purpose is to employ a strip electrode and/or a barrier strip composed of a composite metal, in a sandwich with a sintered or unsintered powdered metal layer, and preferably having wrought metal on both sides and sintered or unsintered powdered metal in the interior of the sandwich, or on one face of an open sandwich.

A further purpose is to positively feed the barrier strip toward the point of welding so that the barrier strip will be utilized at a rate greater than the rate of progression of the weld with respect to the base metal.

A further purpose is to employ a barrier strip which is of a different thickness than the strip electrode and preferably thicker than the strip electrode to provide the desired relative rate of fusion of the barrier strip and the strip electrode.

A further purpose is to prepare guides on the welding head to guide the barrier strip so that it is properly located.

A further purpose is to hold the barrier strip against a steel work surface by a holding device such as a holddown roll.

A further purpose is to tack weld the barrier strip to the base metal prior to the overlay welding, using for example spot welding, seam welding or arc welding techniques.

A further purpose is to bond the barrier strip to the base metal prior to overlay welding by adhesive which is electrically conductive, suitably an inorganic adhesive.

A further purpose is to deposit an adhering layer of flux on the base metal prior to application of the barrier strip.

A further purpose is to deposit an adhering decarburizing compound on the base metal, as for example, iron oxide, or to leave a layer of mill scale on the base metal to help in decarburizing.

A further purpose is to automatically determine the relation of the barrier strip to the previous weld bead by a photoelectric cell, which when an improper relation exists will automatically signal or stop the operation.

Further purposes appear in the specification and in the claims.

In the drawings we have chosen to illustrate a few only of the numerous embodiments in which the invention may appear, selecting the forms shown from the standpoints of convenience in illustration, satisfactory operation, and clear demonstration of the principles involved.

FIGURES 11 to 13 show a modified form of electrode feed guide and contact mechanism.

In the prior art in applying overlay weld metal to the work or base metal, difficulty has been encountered because of the tendency to intrude slag in pockets between adjoining weld beads, because of the inability to obtain thick overlay deposits at high rates of deposit, and because of the difficulty in making thin ferrous metal overlays in which the carbon content is low and the dilution is low. The dilution has commonly been 30% or higher in submerged arc welding under conventional practice. In overlay welding, using a strip electrode, but without the benefit of a barrier strip, the dilution has commonly been 25 to 30%.

The present invention constitutes a very substantial improvement over prior practices in these and in other respects.

In accordance with the present invention, deposition rates can be greatly increased as compared with this prior practice. I find that weld metal can be deposited at a rate of at least 60 pounds per hour.

In accordance with the present invention dilution can be limited readily to less than 20% and commonly to less than 10% or as low as 5%.

The present invention lends itself to making thick overlays, as thick as one half inch or greater in a single pass, although it can also be applied to the production of relatively thin overlays, of the order of ⅛ inch to ⅜ inch. The principles of the invention can be applied to producing one-pass overlays in which the overlay thickness will be ½ inch or greater, if desired.

The invention lends itself to depositing overlays of a wide variety of alloy compositions, including plain carbon and chromium-nickel stainless steel, Inconel, Monel, copper and a wide variety of other overlay alloys. The base metal would preferably be low carbon plain carbon steel or low alloy weldable steel as desired. Monel is an alloy of 67% nickel and 30% copper by weight, the balance being impurities which may be silicon. Inconel is an alloy of 76% nickel, 16% chromium and 8% iron by weight.

One of the great advantages of the present invention is that a strip electrode arcs to a weld pool formed by melting the strip electrode, the barrier strip, an edge of the previous weld bead and the top surface of the base metal in such a way as to melt a very thin layer of the base metal and also so as to melt a portion of the adjoining edge of the previous weld bead.

In the present invention it is not necessary or important to have air gaps behind the barrier strip which may be of any particular size or dimension, although effective overlay welding can occur with air gaps behind the barrier strip due, for example, to defects or imperfections in the surface of the base metal. The present invention, however, makes it possible to deposit overlay effectively without requiring the tight control of the distance between the arc and the work surface which is necessary in series arc methods.

In some cases it is desirable to have extra metal available adjoining the last weld bead to fill the groove between it and the barrier strip, as in the case of an irregular bead against which the barrier strip cannot be laid in continuous contact, and for this purpose in some cases I provide a flange or rim on the edge of the barrier strip adjoining the previous weld bead. Also in some cases it is desirable to provide excess metal at the edge of the barrier strip remote from the previous weld bead and for this purpose I in some instances provide a flange or rim at the edge of the barrier strip. It will be evident that I can provide a flange or rim on both edges, although for economy in illustration I do not separately show this.

It is important that the barrier strip lie flat against the base metal where the base metal's surface is flat. Otherwise, the barrier strip will generally conform to the base metal if the base metal's surface is curved or irregular. For the purpose of encouraging the barrier strip to lie flat against the flat base metal, I in some cases cold-roll the barrier strip so that it will have a slight spring property and as it uncoils will tend to lie flat.

It becomes important in many applications to have the strip electrode overhang the adjoining edge of the previous weld bead, as well as overhang the barrier strip. This in some cases will provide direct arcing to the previous weld bead to assure more effective union at the bead without the possibility of inclusions or shuts of slag. The strip electrode where desired overhangs both edges of the barrier strip, as well as overhanging the adjoining edge of the previous weld bead, thus assuring more effective melting of the remote edge of the barrier strip.

In order to overlay with a strip electrode which may be wider with respect to the barrier strip than would be desired in a particular installation, the strip electrode can be skewed with respect to the longitudinal direction of the barrier strip and the forwardly disposed skewed edge can be located either overhanging the previous weld bead or overhanging the remote edge of the barrier strip.

It will often be desirable to employ a barrier strip which is thicker than the thickness of the corresponding strip electrode, since the barrier strip will often merely lie against the base metal and be consumed at the rate of progression of the weld, while of course the strip electrode may be fed at a considerably greater rate than the rate of progression of the weld. In some cases, however, it is desirable to positively feed a barrier strip toward the arc at a rate greater than the rate of progression of the arc so as to provide extra metal from the barrier strip to form part of the weld deposit.

The angle of contact of the weld bead with the base metal, which determines the contour of the weld bead, is a function of various factors, among which are the character of the flux and the speed of progression of the weld. With the flux mentioned in Example 1, at a speed of travel of eleven inches per minute, the weld bead had a high crown and did not blend smoothly with the base metal. When all other conditions were the same, however, but the speed of travel was increased to sixteen inches per minute, the weld bead blended smoothly with the base metal and formed a proper entry angle. Similar experiments, however, performed with a flux having a substantially higher content of aluminum oxide than that of Example 1, gave very steeply crowned weld beads. The angle of contact of the weld bead with the base metal is important among other things in determining how close the barrier strip can be brought against the previous weld bead and the presence or absence of a space or gap between the barrier strip and the previous weld bead on the side remote from the base metal, assuming the barrier strip is placed as close as possible to the previous weld bead.

In order to adjust the barrier strip for proper guiding with respect to the edges of the electrode, I preferably provide on the welding head adjustable guides which will tend to orient the barrier strip and the welding head correctly with respect to one another.

In some cases it is desirable to guide the barrier strip and hold it against the base metal close to the previous weld bead independently of the pressure roller. This can be accomplished by provision of guiding fingers engaging the barrier strip.

In some cases, however, as in overlaying on base metal which has an irregular surface, the barrier strip is more firmly adhered to the base metal prior to overlay welding as by tack welding. For the purpose of tack welding, spot welding, seam welding, or arc welding techniques may be used, as well known in the art.

An additional feature is to apply to the base metal a deoxidizing coating which will promote welding by protecting against oxidation of the surface where such is not desired. A suitable example is lacquer having 7% of nitrocellulose and 3% of aluminum powder through 100 mesh, dissolved in a suitable lacquer solvent such as butyl acetate, or a mixture of equal parts by weight of ethyl acetate and toluol. This composition when dry is sufficiently electrically conducting so as not to interfere with welding. This composition has adhesive properties if applied as a glue in a wet or tacky condition, to hold the barrier strip to the base metal.

It may in some cases be desirable to apply to the base metal prior to the application of the barrier strip an adhering layer of flux, for example, a flux coating of which an example is the following:

*Example A*

A saturated solution of boric acid in water, or a suitable alcohol such as methyl, ethyl or isopropyl alcohol.

*Example B*

A saturated solution of ammonium chloride in water, or a suitable alcohol as mentioned in Example A.

*Example C*

A saturated solution of lithium chloride in water, or a suitable alcohol as mentioned in Example A. The solvent should be allowed to evaporate before welding begins.

Where the base plate is high carbon steel, it is desirable to decarburize the base metal to a substantial depth, of the order of at least 0.030 inch, so as to avoid excessive carbon pick-up even where there is a relatively small amount of dilution, not exceeding 20%. For this process I prefer to provide an adhering decarburizing compound flux on the base metal prior to application of the barrier strip. An example of a decarburizing flux is iron oxide suspended in a vehicle having adhesive properties as follows:

*Example D*

10% of chromium oxide $Cr_2O_3$ particles through 100 mesh

10% of iron oxide $Fe_3O_4$ particles through 100 mesh

Sodium silicate having a ratio of 1 part sodium oxide to 3.22 parts silica at 30° Baumé, solids content of 25–30%, water balance.

The water should be allowed to evaporate before welding begins, or the work should be baked to dry it well.

I also find that decarburizing of the base metal can be promoted by leaving iron oxide scale on the steel which forms on the base metal or by deliberately scaling the surface of the steel as for example by exposing it in an oxidizing furnace atmosphere or scaling it with a blow torch until a thin adhering scale layer is formed.

In some cases it is important to point out to the welding operator the fact that the barrier strip tends to become remote from the previous weld bead. This can be done with a photoelectric cell mechanism which will either operate an alarm or will automatically stop the welding operation, as such time as the gap between the barrier strip and the previous weld bead becomes excessive.

I find that as the space between the previous weld bead and the adjoining edge of the barrier strip increases from zero up to ¼ inch, the amount of dilution increases markedly. Thus, if the overlay is of chromium-nickel stainless steel, under given conditions the content of chromium and nickel in the overlay decreases as the gap increases from zero to ¼ inch. Sometimes the adjoining edge of the previous weld bead is irregular, so that even if the barrier strip is in contact with the previous weld bead at all of the protruding points of the edge, it will be spaced therefrom at intermediate points. To reduce the dilution to a minimum, the average gap should be reduced to a minimum, and the number of points at which the barrier strip is out of contact with the previous weld bead should be minimized. While the condition of contact of the barrier strip with the previous weld bead is desirable, moderate spacing between the barrier strip and the previous weld bead is tolerable providing allowance is made for the extent of dilution.

Figures 18, 20, 22:
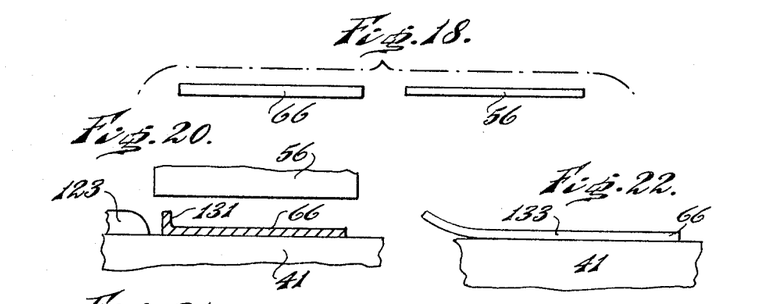
FIGURE 18 is an end view of the barrier strip and the strip electrode in one preferred embodiment.
FIGURE 20 is a view similar to FIGURE 6 showing a further modification.
FIGURE 22 is a side elevation showing the barrier strip resting flat against the base metal.

It will be evident that where a gap is present between the previous weld bead and the barrier strip, either by design or accident, the presence of additional metal at the gap will be desirable (FIGURE 20).

It is desirable to indicate to the welder in case the barrier strip ceases to feed, and this can be done by suitable indicating means or automatic stopping of the welding operation.

Referring now first to the drawings as shown in FIGURES 1 to 10 inclusive, I there illustrate a welding machine which can be disposed directly above a pressure vessel side wall or end, or other base metal on which overlay welding is being accomplished but which for convenience in illustration is shown provided with a base 40 which supports a suitable plate 41 which comprises the base metal and in many cases will be plain carbon or low alloy steel.

Adjoining the plate and preferably above it is a rail 42 extending longitudinally in the direction of the weld bead, and desirably including a base portion 43 and an upwardly directed track 45 (FIGURES 1, 2, 4 and 5) which receives and guides groove rollers 46 on a carriage 47 for advancing the welding arc at a predetermined speed of progression along the work. The carriage 47 is motor driven as desired.

The rail 42 is supported in any suitable manner as by supports 48.

Figure 1:
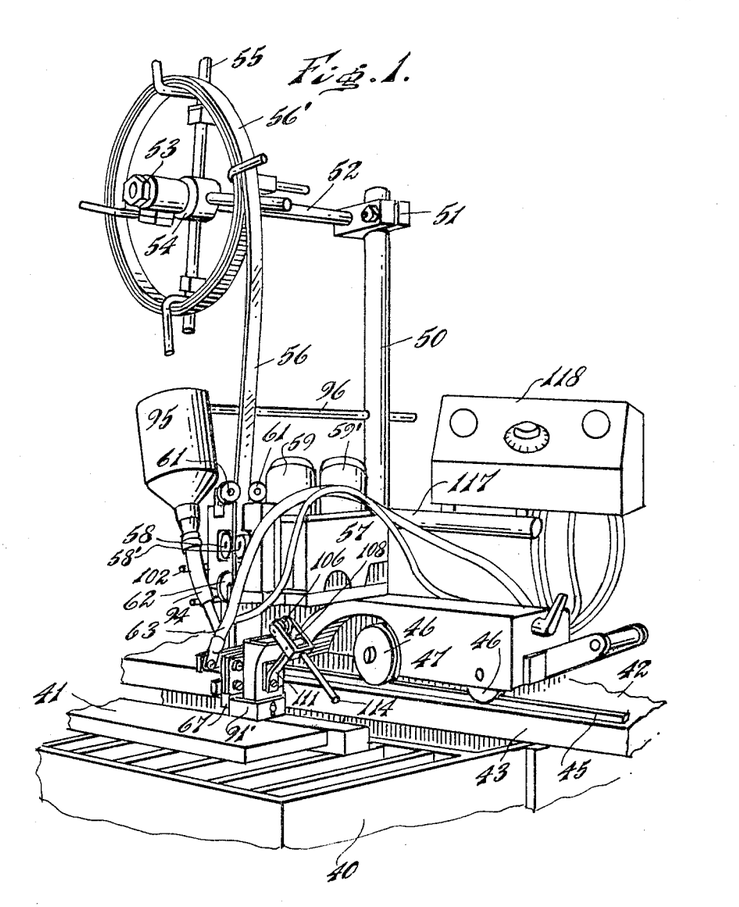
FIGURE 1 is a perspective showing a welding machine of the invention, omitting the barrier strip, and with the holddown roller for the barrier strip retracted.
Figures 1A, 31, 33:
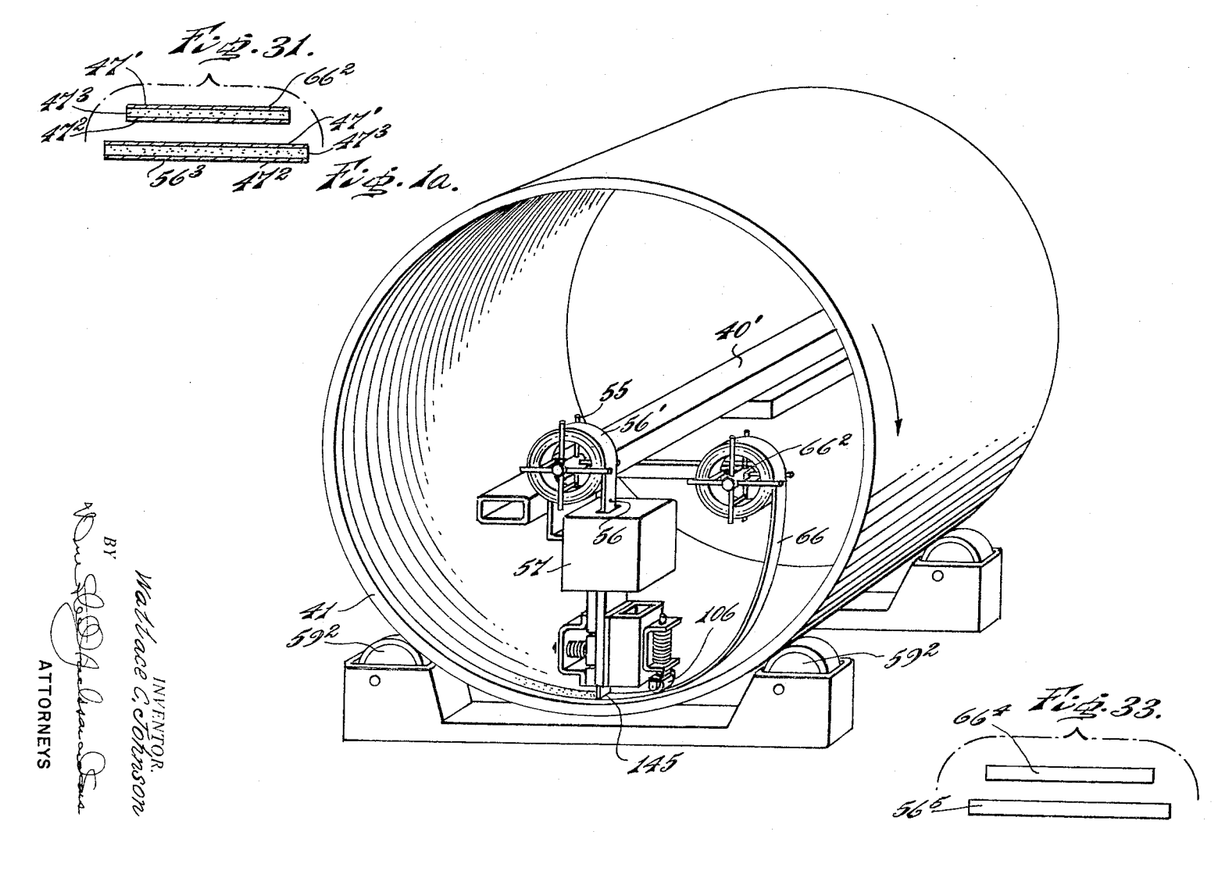
FIGURE 1a is a diagrammatic perspective showing a welding machine of the invention applied to the interior overlaying of the wall of a tubular vessel such as a pressure vessel.
FIGURE 31 is a diagrammatic end elevation showing a composite strip electrode and a composite barrier strip for use cooperatively, or with another barrier strip or another strip electrode as the case may be.
FIGURE 33 is a diagrammatic end elevation showing a sintered powdered metal strip electrode and a sintered powdered metal barrier strip for use cooperatively, or with another barrier strip or another strip electrode as the case may be.
Figure 2:
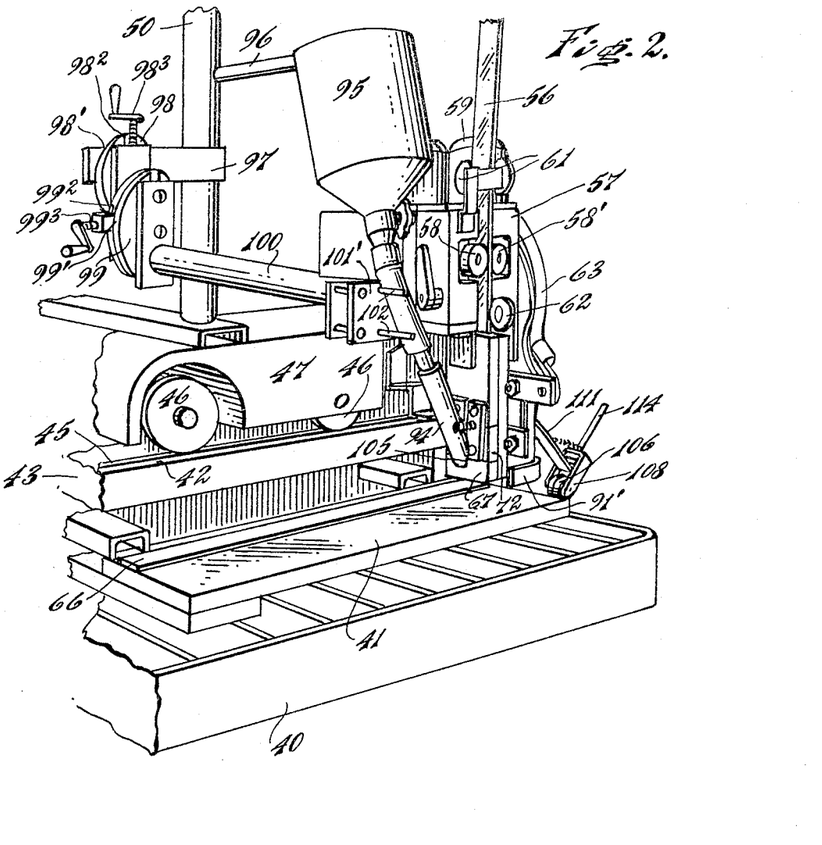
FIGURE 2 is an enlarged fragmentary perspective of the welding machine of FIGURE 1, omitting the upper portion including the reel for the strip electrode, but showing the previous weld bead and omitting the flux.
Figure 3:
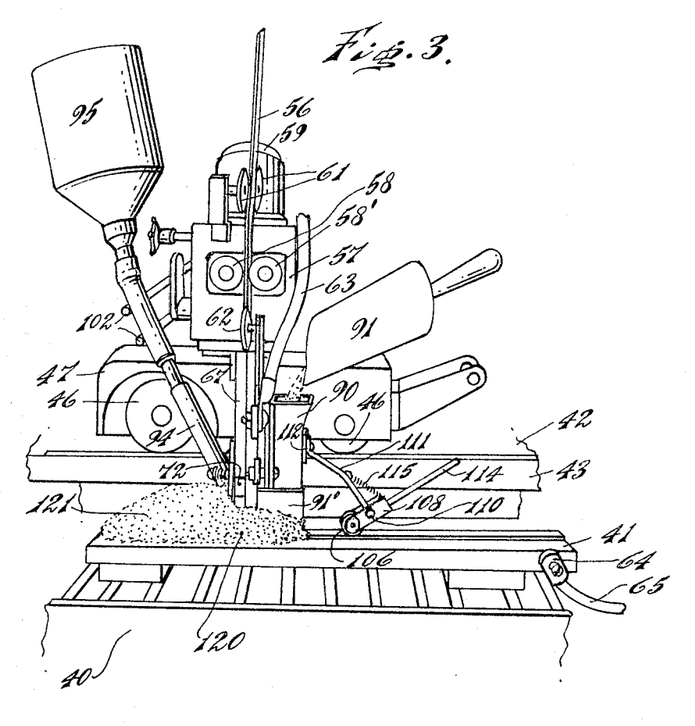
FIGURE 3 is an enlarged perspective of FIGURE 1 omitting the section at the top and showing the application of the flux from two different chutes.
Figure 4:
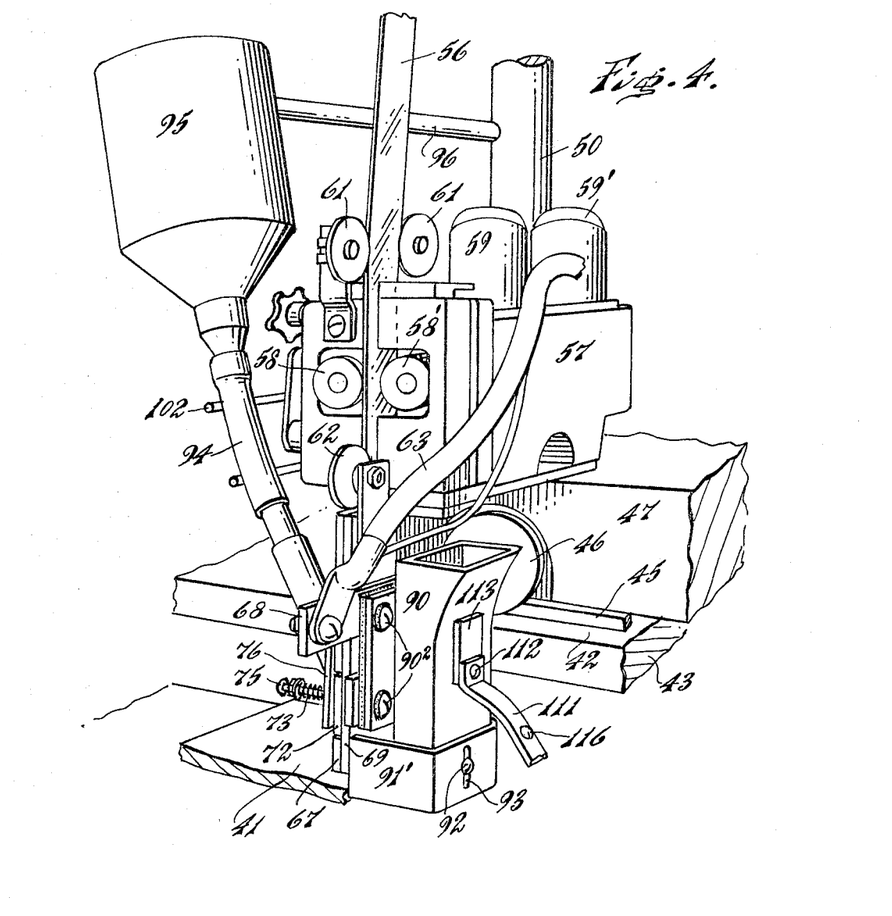
FIGURE 4 is a further enlargement of the welding machine shown in FIGURES 1, 2 and 3, omitting the upper portion of the welding head and the flat barrier strip.

In FIGURE 1a I show a typical example of a welding machine operating inside a cylindrical section of a pressure vessel 41 and illustrating the machine supported on a suitable positioner boom 40′ which mounts all parts of the machine, including the electrode 56 and its coil 56′, the electrode feed mechanism 57, the barrier strip 66 and its supporting reel 66². The shell 41 is supported on a suitable rotating manipulator of which manipulator rollers 59² only are shown so that it can be rotated to maintain the arc at the desired position with respect to the point on the shell immediately below the axis, the manipulator desirably continuously rotating the shell so that the arc is always at the same position.

The axis of the manipulator is desirably placed slightly removed from the horizontal desirably tilted from ½ to 10° down on the side adjoining the previous weld bead and preferably about 2 to 5° down so that the tendency is to throw the weld pool toward the adjoining weld bead and give better overlap of the previous weld bead. However, the pool must not overflow on the downward side. Also it has been found to be desirable not to weld with the arc immediately below the axis, but preferably to weld at a position back of the point immediately below the axis with respect to the direction of rotation of the positioner by an amount of ¼ to 3°, and preferably 1 to 2°. The welding is then in effect taking place uphill so that there is more control of the weld pool because of the shallowness of the weld pool, and the weld does not tend to form large grains of weld metal, and gives more dimensional stability to the overlay deposit.

While in the form shown the shell 41 is hollow and the welding is taking place at the bottom of the inside of the shell, it will be evident that the principles of the invention can be applied where the welding is taking place on the outside of a shell such as a cylinder or roll which is positioned in a corresponding manner except that the welding is taking place adjacent to the top of the cylinder when it is positioned on a generally horizontal axis. Of course, it will be understood that when one is welding on the outside of a shell, wherever reference in this description is made to the inside, it will be understood that the outside should be referred to, and where reference is made in the description to welding near the bottom, it will be understood that the welding should be near the top but with corresponding positional relationship. In the case of welding on the outside of the roll, the welding is in effect being accomplished on the downhill side of a position immediately above the axis, and the weld pool will tend to crowd forward underneath the arc, with the advantage that the penetration into the base metal will be reduced. This location of the arc also gives more control of the weld pool in that a longer time is given for the solidification of the weld metal, which otherwise might tend to run off the cylinder.

The carriage 47 supports a column 50 which at the upper end mounts an adjustable clamp 51 which carries an arm 52 which pivotally mounts on its outer end at 53 a hub 54 of an electrode strip reel 55 of a type well known in the art which can be adjusted from the inside to fit on a coil. Carried on the reel and idling thereon is a coil 56′ of strip electrode 56 which is relatively thin in the direction of progression of the arc along the prior weld bead and along the barrier strip as later explained but relatively wide in the direction transverse thereto. Thus, while the electrode may be as wide as one half inch to 12 inches or even wider, its thickness will suitably be in the range of .020 inch to .250 inch. The electrode 56 is progressed downward by a motor driven electrode feed device 57 well known in the art and mounted on the carriage 47.

The strip electrode 56 has idling rollers 58 engaging the electrode on one side face and a suitably knurled roller 58′ engages the opposite face, driven in the forward or reverse direction by one of the motors 59 or 59′ as well known. At the opposite edges of the strip electrode above the rollers 58 and 58′ there are opposed rollers 61 engaging the strip. Near the lower end at one edge of the strip electrode there is a guide roller 62.

Figures 7, 8, 9, 10:
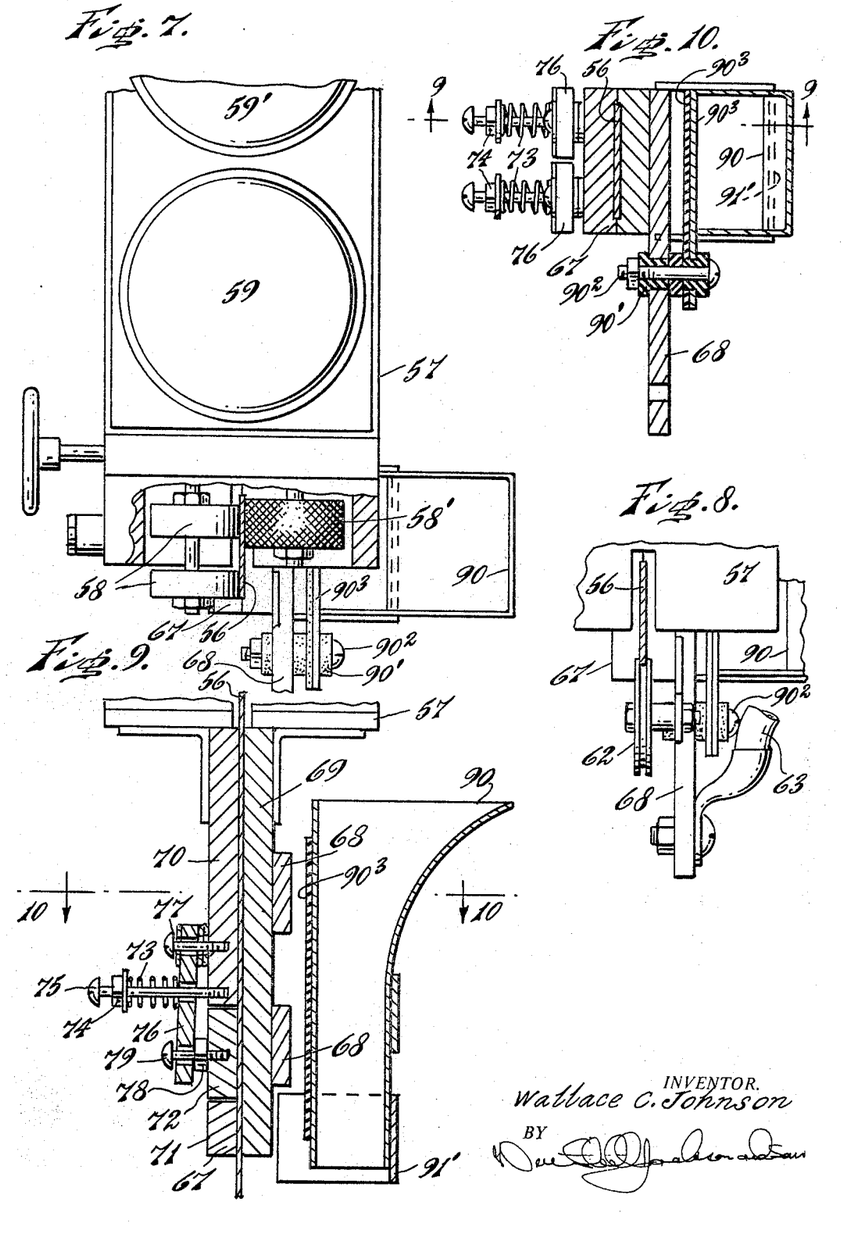
FIGURE 7 is a fragmentary enlarged plan view of the electrode feeding mechanism of the device of FIGURES 1 to 6, partially sectioned away to show the feeding roll.
FIGURE 8 is a fragmentary plan view corresponding to a portion of FIGURE 7, but showing the housing and one of the guide rollers and the electrical connection.
FIGURE 9 is a vertical section through the electrode guide and contact mechanism in FIGURES 1, 2 and 7, best seen in FIGURE 7, the section being taken on the line 9—9 of FIGURE 10.
FIGURE 10 is a plan section of the electrode guide and contact mechanism, the section being taken on the line 10—10 of FIGURE 9.

The strip electrode 56 passes through a copper guide 67 best seen in FIGURES 9 and 10, the guide having suitably a copper shoe 69, the guide receiving electrical connection from a cable 63 to copper contact blocks 68 which engage the contact shoe 69. Electrical contact to the work is made by clamps 64 connected to electric cable 65, both of the cables 63 and 65 extending to the welding generator as well known. Opposite and in spaced relation to the contact shoe 69 are spaced copper contact shoes 70 and 71 which are relatively fixed and engage the electrode, and a movable contact shoe 72 which is spring urged against the electrode in opposition to the contact shoe 69 by helical compression springs 73 acting from adjustable nuts 74 on spring securing bolts 75. The springs 73 act against levers 76 which are pivotally mounted at one end at 77 on the shoe 70 and act against a nut 78 secured on a bolt 79 to the movable shoe 72.

The shoes 69, 70 and 71 and the movable shoe 72 are suitably of copper or other contact-making metal.

The electrode feed mechanism except for the features pointed out may be standard and similar to electrode wire feeds previously used in the art.

Figures 11, 12, 13:
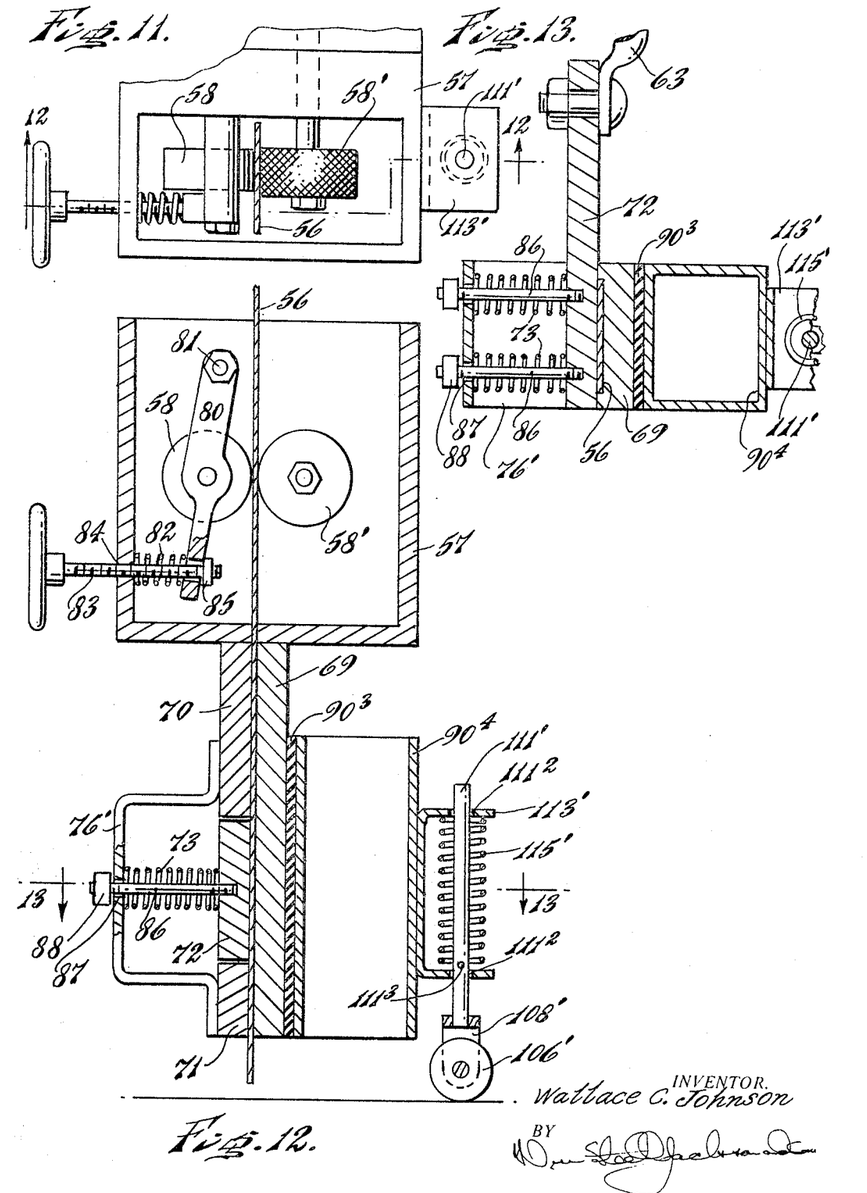
FIGURE 11 is a fragmentary plan view, omitting the guide wheel which is located above the feed roller shown.
FIGURE 12 is a section of FIGURE 11 on the line 12—12.
FIGURE 13 is a plan section of FIGURE 12 on the line 13—13.

In FIGURES 11 to 13 I illustrate a slightly modified strip feed and contact device. In this case idler roller 58 is pivotally mounted on an arm 80 pivoted on the feeder at 81 and biased to bring pressure on the strip electrode against the knurled roller 58′ by a helical compression spring 82. The extent of movement of the roller 58 is restrained by an adjustment screw 83 threaded through the housing at 84 and having at the remote end a suitably fastened nut or abutment 85.

The movable copper contact shoe 72 in this case is biased by helical compression springs 73 acting from spring abutment 76′ against the movable shoe 72. The movable shoe is guided by studs 86 threaded into the shoe passing through openings 87 in the spring abutments and carrying at the outer ends nuts 88. In this form elements 69, 70 and 71 may be of steel.

It will be evident that the strip electrode feed will have features permitting angular adjustment of the direction of strip feed, which are well known in the art and form no part of the present invention.

Figure 5:
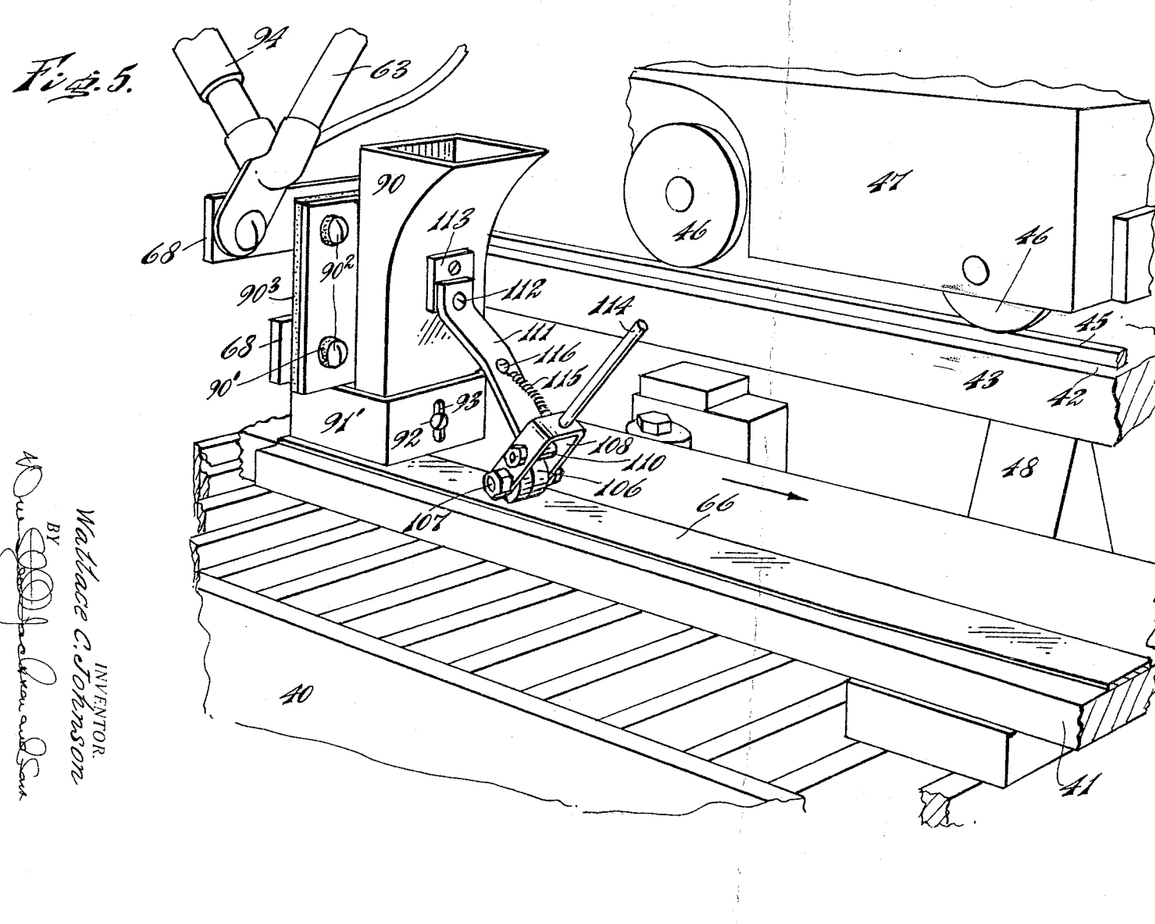
FIGURE 5 is a perspective showing an enlargement of the welding head as shown in FIGURE 4, omitting the upper portion and omitting the flux and a portion of the electrode but showing the barrier strip.

A metallic barrier strip 66 shown in FIGURE 5 is put down against the surface of the work to be overlaid, suitably from a coil similar to the coil 57 for the strip electrode. The barrier strip is relatively wide and relatively thin and it has a width of the order of ½″ to 12 inches or more and related to the width of the strip electrode as later explained. The thickness of the barrier strip will suitably vary between .020 and .250 inch and will be related to the thickness of the strip electrode as later explained.

In the submerged arc welding process, flux is deposited on the barrier strip ahead of the electrode and also behind the electrode, since the strip electrode otherwise will sweep flux off the weld bead as it progresses forward, and it will in some cases be desirable to apply a different flux before and after the weld.

Ahead of the strip electrode there is a flux guiding chute 90 mounted on the carriage as best shown in FIGURES 9 and 10, the mounting suitably being accomplished on the contact blocks 68 by electrically insulating bushings 90′ which have extending through them and through the bars bolts $90^2$. Insulation is also provided at $90^3$ at the back of the chute to guard against electrical contact which would cause arcing from the chute. The chute 90 receives granular flux from scoop 91 or one or more suitable hoppers. The chute 90 has a wider width than the barrier strip and is capable of depositing flux over the entire barrier strip and adjoining weld bead. At its lower end on the forward and lateral sides but not on the rearward side in the direction of motion there is a flux retaining skirt 91′ extending below the hopper 90 and adjusted by a screw 92 extending through an elongated slot 93 and permitting adjustment for height above the barrier strip to avoid arcing to the hopper. The skirt 91 tends to restrain the pile of flux against flowing forward in the direction of progression where it would interfere with the hold-down roller, and sideways but is capable of moving forward without upsetting the pile of flux since there is no rear portion on the skirt.

Behind the weld, supplemental submerged arc granular flux is deposited on the newly formed weld bead through a chute 94 from a hopper 95 supported on a bracket 96. The chute 94 includes flexible tubes and is adjustable in position. This adjustment is accomplished by a bracket 97 supported on the column 50, the bracket 97 supporting fixed element 98 of a vertical adjustment 98′ of well known character having a slide $98^2$ moved up and down by a screw $98^3$. On the slide $98^2$ is supported a transverse adjustment 99 of well known character, having a slide 99′ interconnected to the slide $98^2$ and an element $99^2$ guided on the slide and moved by the adjustment screw $99^3$. The element $99^2$ supports a bracket 100, which mounts the strip electrode feed 57 and also has at its outer end a support 101′ which has pins 102 engaging behind the chute 94 and capable of moving the chute closer or farther away from the location of the arc. The lower end of the chute is diagonally cut at 105 so as to direct the stream of flux toward the arc.

On the forward end of the hopper 90 in the direction of progression of the carriage there is a pressure roller 106 (FIGURE 5) pivotally mounted on an axis 107 in a fork 108 which is pivotally mounted at 110 on an arm 111 which is pivoted at 112 on a pad 113 fastened to the front of the chute 90. As shown in FIGURE 1 the arm 111 can be pivoted upward out of the way when it is desired to insert a new barrier strip 66, and for this purpose the fork 108 is provided with a handle 114.

The roller is resiliently urged against the barrier strip by a helical tension spring 115 anchored at one end to the upper part of the yoke and the other end to a spring abutment 116 on the arm 111.

In the form of FIGURES 11 to 13 a roller 116′ is pivoted in a fork 108′ which is mounted on a plunger 111′ which is guided by openings $111^2$ in U-shaped support 113′. The plunger 111′ is surrounded by helical compression spring 115′ which acts from one side of the U-shaped support against a pin $111^3$ on the plunger and which also holds the plunger in position when the electrode shoes are removed from the work. In this case a chute $90^4$ is secured by insulating means $90^3$ to the electrode guiding shoes, the support suitably including electrically insulating bushings not shown.

A bracket 117 on the carriage (FIGURE 1) supports a control panel 118 provided with suitable instruments and controls for controlling the welding.

It will be evident that in operation a submerged arc occurs at 120 (FIGURE 3) between the lower end of the strip electrode and a weld pool formed by melting metal from the strip electrode, metal from the barrier strip, metal from the edge of the previous weld bead and also the base metal at the upper surface to form an effective overlay weld. This all occurs beneath the submerged arc flux 121, or beneath a gas envelope if a protecting gas is used.

Figures 6, 14, 15, 19:
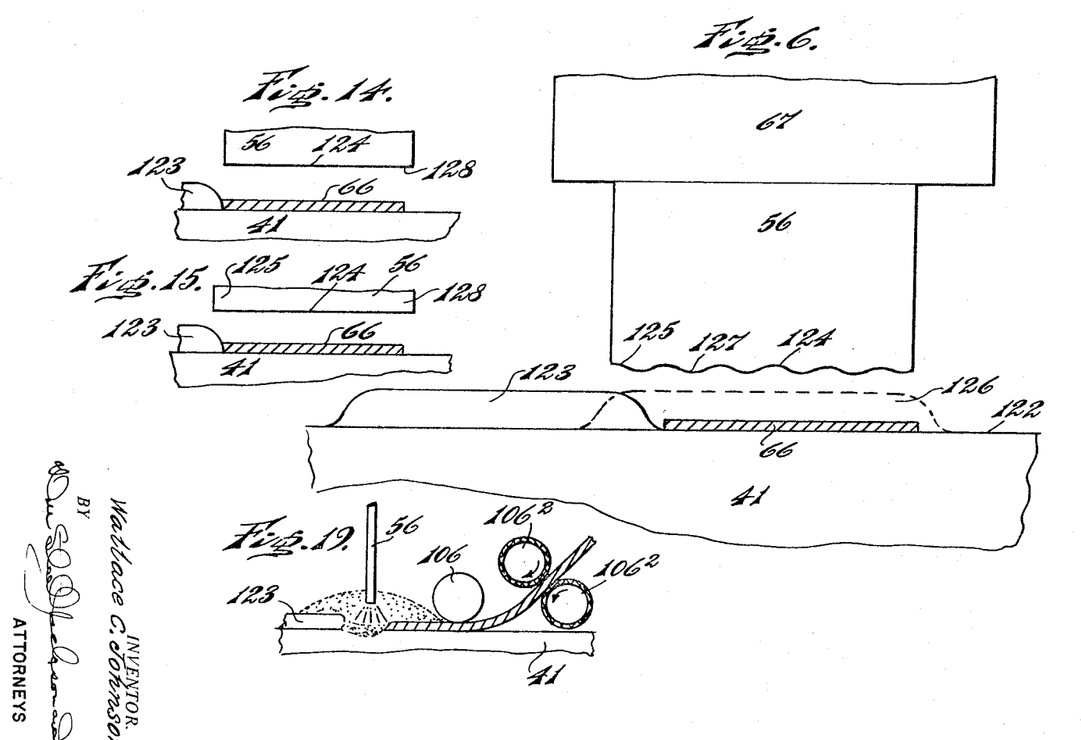
FIGURE 6 is an end elevation partially in section transverse to the surface of the base metal. In common practice, this may be regarded as a vertical section.
FIGURE 14 is an end elevation partly in section transverse to the surface of the base metal, showing a modified relationship between the previous weld bead, the strip electrode and the barrier strip as compared with FIGURE 6.
FIGURE 15 is a view similar to FIGURE 6 showing further modification.
FIGURE 19 is a diagrammatic elevation partly in section transverse to the surface of the base metal showing feeding of the barrier strip toward the weld independently of the progression of the weld.

Referring to FIGURE 6, it will be evident that strip electrode 56 passes down through contact and guide 67 to a point at which in the preferred embodiment it will overhang barrier strip 66 which rests on the exposed surface 122 of base metal 41. The barrier strip adjoins the previous weld bead 123 and extends along it. Since the edge of the previous weld bead may be irregular, a gap is shown at the point illustrated in FIGURE 6 between the previous weld bead and the barrier strip. This gap should be minimized and if possible should not exceed ¼ inch at the wider points. The strip electrode overhangs the barrier strip at 124 and overhangs the edge of the previous weld bead at 125, but in this particular form does not extend beyond the edge of the barrier strip remote from the previous weld bead.

In the normal operation arcing will take place from the electrode 56 to a weld pool formed by melting the barrier strip, melting the strip electrode, melting the edge of the adjoining weld bead and melting the upper surface of the base metal to deposit a new weld bead 126 which will extend the overlay.

The welding will in many cases be carried on with alternating current or direct current and in many instances with D.C. reverse polarity, or straight polarity, constant potential, the current being about 1000 amperes or more, the voltage being preferably of the order of 28 to 32 volts and the travel speed being at least 11 inches per minute in the preferred embodiment.

In experience with maintaining an arc from a strip electrode as shown, it has been found that the arc oscillates laterally forming a scalloped edge 127 at the end of the electrode 56 adjoining the barrier strip, the nearest points of the scalloped edge to the barrier strip constantly changing.

In some cases it may be desirable to have the electrode overhang beyond the edge of the barrier strip remote from the last weld bead as shown at 128 in FIGURE 14, as well as overhanging the previous weld bead at 124, but this is not believed to be indicated unless the electrode will overhang the adjoining weld bead at 125 as shown in FIGURE 15, as well as slightly overhanging the far edge of the barrier strip. This promotes straightness of the weld bead.

Figure 16:
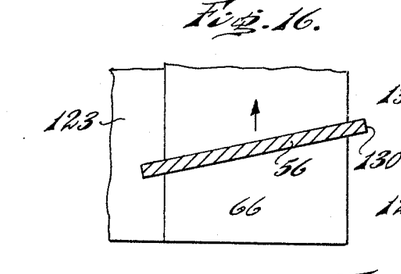
FIGURE 16 is a section transverse to the length of the strip electrode looking at the previous weld bead and the barrier strip. From the standpoint of usual practice, this can be regarded as a sectional plan view.
Figure 17:
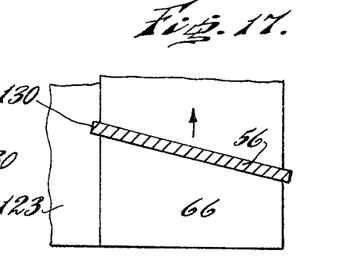
FIGURE 17 is a view similar to FIGURE 16, showing a modified relation of the strip electrode with respect to the length of the barrier strip.

In most instances it will be desirable to have the strip electrode arc on the previous weld bead so as to melt the adjoining edge of the previous weld bead to make a good joint with the new overlay weld bead, but the precise control of the existence of overhang at a particular side and the extent of overhang at the particular side may present a problem in utilization of an existing stock of barrier strip with an existing stock of strip electrode. To solve this problem I show in FIGURES 16 and 17 strip electrodes 56 being fed toward barrier strips 66 which lie against adjoining weld beads 123. With the direction of progression of the electrode and the arc as shown by the arrow in the general direction of the thickness of the strip electrode and in the direction of the length of barrier strip, it will be seen that the showing of the strip electrode with respect to the direction transverse to the length of the barrier strip can be controlled to give a desired extent of overhang at the two edges of the barrier strip without requiring that the plant keep in stock a large number of barrier strip and strip electrode sizes. In FIGURE 16, the most forward edge 130 of the strip electrode in the direction of progression is located overhanging the base metal at the edge of the barrier strip remote from the previous weld bead while in FIGURE 17 the most forward edge 130 overhangs the previous weld bead.

In many forms of the invention the barrier strip 66 lies against the base metal 41. In order to accomplish most efficient overlaying, it will often be desirable that the barrier strip 66 be somewhat thicker than the strip electrode 56 as shown in FIGURE 18. By the same token, it may be desirable to have the strip electrode wider as shown. The extent of excess width of the strip electrode compared to the barrier strip in the preferred embodiment will provide for up to ½ inch overhang of the strip electrode at the side adjoining the previous weld bead and ¹⁄₁₆ inch overhang at the side of the barrier strip remote from the previous weld bead.

In some cases it is desirable to feed the barrier strip positively toward the weld pool as shown in FIGURE 19 in which suitably knurled feed rollers 106² are positively driven to advance the barrier strip 66 toward the weld pool at a rate which will exceed the rate at which the barrier strip would be fed to the weld pool by mere advance of the arc with progression of the welding bead. This makes the feed of barrier strip independent of the relation of barrier strip to thickness of strip electrode.

Figure 21:
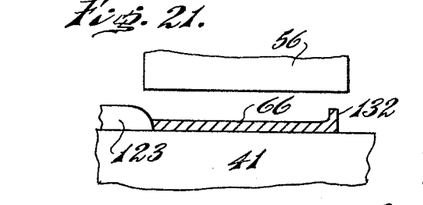
FIGURE 21 is another view similar to FIGURE 6 showing a different modification.

In some cases the barrier strip should be flanged at one of the edges so as to provide excess metal at that location. In FIGURE 20 the barrier strip is provided with a flange 131 adjoining the previous weld bead and upstanding toward the strip electrode 56 whereas in FIGURE 21 the barrier strip has a flange 132 on the side remote from the previous weld bead.

While as already described in the preferred embodiment a roller 106 rides on the barrier strip to hold it down ahead of the point of welding, if the barrier strip is annealed, it may be difficult to keep it flat against a flat surface of the base metal. In some cases, particularly in the case of overlays of stainless steel, Inconel, Monel, copper and the like, the barrier strip of such metals is cold-rolled so that its spring quality will tend to make it straighten out when it is unreeled inside a rotary shell. Thus, it will lie flat against the curved surface of the base metal as shown at 133 in FIGURE 22. It will be evident however that gaps between the base metal and the barrier strip are not objectionable and said overlays can be had in spite of this. Such has been actually demonstrated.

Figure 23:
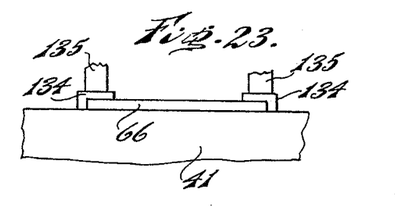
FIGURE 23 is an end elevation showing a roll holding the barrier strip against the base metal.

Various expedients may be adopted to position the barrier strip in advance of the weld pool as shown in FIGURES 23 to 26 inclusive. In FIGURE 23 the barrier strip 66 is guided by adjustable guide fingers 134 suitably mounted ahead of the guiding roller by springs 135.

Figure 24:
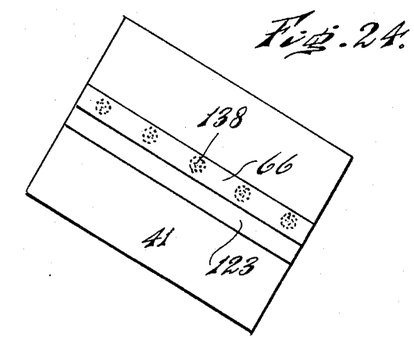
FIGURE 24 is a plan view showing the base metal, the previous weld bead and the barrier strip, and particularly illustrating spot welding of the barrier strip to the base metal.
Figure 25:
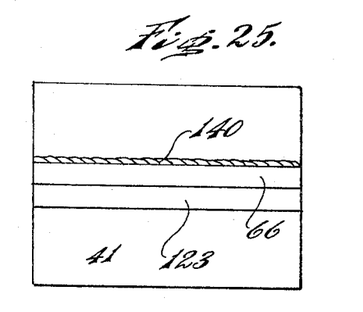
FIGURE 25 is a view similar to FIGURE 24 of seam welding of the barrier strip to the base metal.

The barrier strip can if desired be tack welded on the base metal prior to overlay welding. In FIGURE 24 I show a barrier strip 66 which is spot welded at points 138 to the surface of the base metal adjoining the previous weld bead. In FIGURE 25 the barrier strip is seam welded at 140, for example using short-arc technique.

Figure 26:
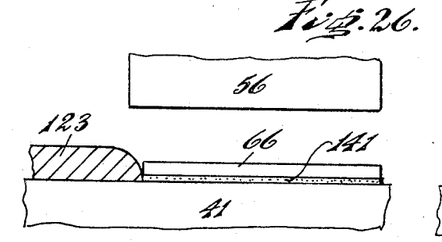
FIGURE 26 is a view similar to FIGURE 6 showing a modification with adhesive securing the barrier strip to the base metal.

In FIGURE 26 the barrier strip is bonded to the base metal by an electrically conducting adhesive 141, suitably consisting of nitrocellulose and aluminum powder in a nitrocellulose solvent as above described.

In some cases it is important to apply an adherent fluxing adhesive layer to the surface of the base metal on which the overlay is to be employed. The adhesive layer may consist substantially entirely of deoxidizers such as aluminum powder or magnesium powder held by a bonding agent such as sodium silicate in a composition which may, for example, be as follows:

Aluminum powder—100%
Sodium silicate having a ratio of 1 part by weight of sodium oxide to 3.22 parts by weight of silica, 30° Baumé—20% on the dry weight of other ingredients.

The adhesive may consist of 95% of calcium fluoride and 5% of manganese powder bonded by 10–20% of sodium silicate as above referred to on the dry weight of the other ingredients.

Another suitable fluxing adhesive for this purpose is for example composed of 98% of calcium fluoride and 2% of aluminum powder through 100 mesh, similarly bonded by sodium silicate as described.

Figure 27:
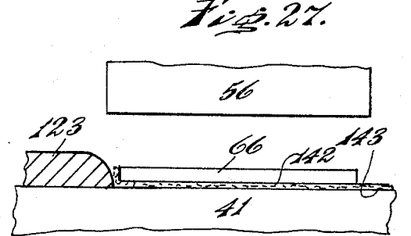
FIGURE 27 is a view similar to FIGURE 6 illustrating an adherent flux applied to the base metal before the barrier strip is put in place.

This can be applied as a coating 142 (FIGURE 27) and after the coating dries the barrier strip will then be applied on it and welding carried on so as to fuse the flux layer 142 and cause it to flow to the top of the weld pool and join the slag.

In some cases it is important to decarburize the surface 143 of the base metal prior to the completion of overlay welding. This can be accomplished by furnace decarburizing, for example, in an atmosphere of wet hydrogen at a temperature of 1200 to 1400° F. It can also be accomplished by applying a decarburizing flux such as ferric oxide in a suitable vehicle as described above or by applying a layer of adhering ferric oxide scale to the surface 143 of the base metal.

In operation of the forms just described, submerged arc welding technique will suitably be employed, the flux being deposited uniformly on top of the weld pool both around and beyond the arc as the strip electrode progresses. The strip electrode will arc to the weld pool and the weld pool will be composed of molten barrier strip, molten strip electrode, molten metal from the edge of the prior weld bead and a small amount of molten metal from the surface of the base metal, it being intended to limit penetration into the base metal by the barrier strip so that the dilution will not exceed 10%, or at least not exceed 20%.

Figures 28, 29:
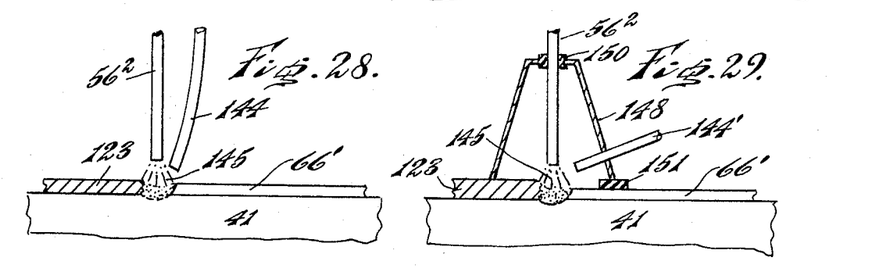
FIGURE 28 is a diagrammatic view transverse to the plane of the surface of the base metal illustrating application of protecting gas to the weld by a snorkel.
FIGURE 29 is a view similar to FIGURE 28 showing a hood over the weld to contain the protecting gas.
Figure 30:
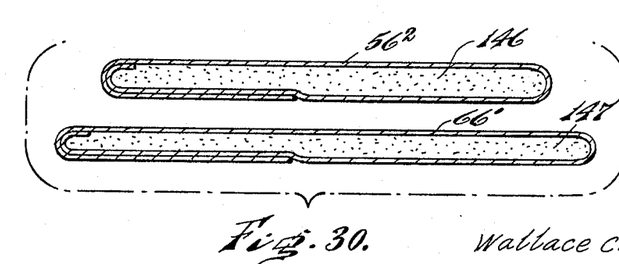
FIGURE 30 is a transverse section of a combination of barrier strip and strip electrode, each having a flux core, which will where desired contain alloying ingredients.

While the invention will in many cases be carried out using submerged arc welding technique, it will be evident also that the process can be carried out by feeding flux as a core and supplying a protective gas such as carbon dioxide, argon, helium or a mixture of any of them. In FIGURE 28, I illustrate a snorkel or gas tube 144 blowing gas to surround the arc 145. While the welding can be carried out without flux, it will be best to introduce flux as a core 146 in the strip electrode 56² of FIGURE 30 or as a flux core 147 in a barrier strip 66' of FIGURE 30 or by both means. In each of these cases there is a strip electrode or barrier strip made by forming sheet to surround the flux core which may have a composition as set forth in Danhier U.S. patent, No. 2,991,931, granted September 6, 1960, for Automatic Arc Welding Process, Equipment and Electrode.

There will be advantages in certain cases of making use of powder metallurgy techniques in forming strip electrode and barrier strip. In FIGURE 31 I show a strip electrode 56³ and a barrier strip 66², each of which is made by forming a composite having a solid metal billet on each side and including metal powder with or without flux ingredients in the interior, welding the composite to hold it together, rolling it and then shearing the edges, thus obtaining outer layers 47' and 47² made from the solid billet and an interior dense powder metal layer 47³ made by consolidating and welding the powder metal to the outer layers. This has the advantage of great flexibility since the alloying ingredients can be added to the powder metal layer.

Figure 32:
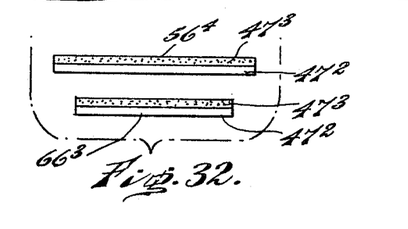
FIGURE 32 is similar to FIGURE 31, but shows a composite strip electrode and a composite barrier strip formed as an open sandwich.

FIGURE 32 shows a strip electrode and a barrier strip similar to those of FIGURE 1 in which there is an open sandwich, the wrought metal being on one side and the powder metal compact being on the other side.

In the forms of FIGURE 31 and 32, the powder metal will in some cases be sintered, but in other cases it may be merely compacted, particularly where the sandwich is formed directly at the welding machine.

Techniques are now well known in the art for forming powdered metal strips without backings, either sintered or unsintered. Such strips lend themselves to producing strip electrode $56^5$ and barrier strip $66^4$ as shown in FIGURE 33. One of the advantages in this case also is flexibility in compounding the particular alloying ingredients from powdered metals. By hot rolling with or without cold rolling the density is increased to from 70 to 99% of the density of a wrought iron alloy. The powder metallurgy strip is ductile enough to coil and uncoil. It has adequate electrical conductivity and has the advantage over wrought strip that it has a higher electrical resistance and therefore has greater $RI^2$ heating.

In some cases it may be desirable to surround the weld with an enclosure or hood 148, FIGURE 29, which has a suitable insulating guide 150 for introducing the strip electrode $56^2$ and a suitable insulating guide 151 for introducing a barrier strip 66', protective gas being blown in through a gas tube or snorkle 144'.

In preparing the base metal for overlay welding, unless it be desired to retain scale for decarburizing, the surface on which the overlay is to be applied will preferably be sand blasted, shot blasted, or machined so that it is clean. It then can be left bare or coated with an adhering layer of flux as above described.

Example 1

A strip electrode was used of type 304 stainless steel, 2 inches wide and 0.030 inch thick. The barrier strip was 0.030 inch thick and 2 inches wide of type 304 stainless steel. The base metal was steel of SAE 1025 composition. The current was 900 amperes direct current reverse polarity, constant potential, at 28 volts.

The flux used had the following composition by weight:

| | Percent |
|---|---|
| Fluorspar | 25 |
| Aluminum silicate | 15 |
| Clay | 2 |
| Calcium silicate | 48 |
| Manganese metal powder through 100 mesh | 3 |
| Chromium metal powder through 100 mesh | 6 |
| Deoxidizer (aluminum metal powder through 100 mesh) | 1 |
| Sodium silicate as above referred to based on the weight of the dry ingredients | 20 |

Submerged arc welding practice was employed. Seven inches of electrode was melted for one inch of barrier strip in making a stainless steel overlay on low carbon plain carbon steel ⅜" thick. Sixty pounds of overlay metal per hour was deposited at a travel speed of 12 inches per minute. This compares with 30 pounds per hour deposited using a comparable twin wire series arc method. The overlay welds were sound and free from cracks and flux inclusions as shown by X-ray and sonic tests.

Example 2

The procedure of Example 1 was carried out except that the barrier strip of type 304 stainless steel had a thickness of 0.062 inch. The overlay deposit in this case was 75 pounds per hour. Sound welds were obtained. The dilution was less than 10%.

Example 3

In this case the electrode was 3 inches wide and 0.030 inch thick, type 304 stainless steel. The current was 1200 amperes and the rate of progression was 9 inches per minute, otherwise following the procedure of Example 1. The barrier strip was the same width, thickness and composition. The rate of deposition of sound overlay metal of type 304 stainless steel was 90 pounds per hour.

Example 4

A pressure vessel shell of steel 6 feet in inside diameter and 2 inches thick was given a one layer overlay having an analysis of 18% chromium, 8% nickel, 0.035% carbon, balance iron. The electrode strip was 0.030 inch thick and 2 inches wide. The barrier strip was 0.050 inch thick and 1⅝ inches wide. Both the electrode and the barrier strip were type 308L stainless steel. The base metal composition was AISI 1020. The resulting overlay was 5/32" thick. It was deposited using a current of 1200 amperes D.C. straight polarity at 28 volts, the speed of progression being 16" per minute and the deposition 90 pounds of overlay metal per arc per hour. Tests were made for strength and soundness of the weld and it was found to be sound throughout. The dilution in the overlay was less than 10%.

Example 5

A series of welding machines in accordance with the invention is set up within cylindrical pressure vessel shell portions of uniform diameter, there being a common axis for all the cylinders. All of the cylinders are advanced in unison and thus overlay deposits are formed simultaneously on each of the cylinders.

Example 6

In this case the strip electrode was 3 inches wide and 0.030 inch thick, type 304 stainless steel and the barrier strip was 2½ inches wide, 0.060 inch thick, type 304 stainless steel. The current was 1500 amperes D.C. straight polarity, at 28 to 30 volts. The strip electrode overhung the adjoining weld bead ⅜ inch. The rate of progression was 11 inches per minute. The rate of deposition was 150 pounds per hour from a single arc and, in depositing 3/16 inch overlay, this covers 20 square feet per hour.

Example 7

The procedure of Example 1 was carried out and the dilution was measured and found to be less than 20%.

Example 8

Using a type 304 stainless steel electrode 2 inches wide and 0.030 inch thick and a type 308L stainless steel barrier strip 1¾ inch wide and 0.060 inch thick, and otherwise following Example 1, 12 linear inches of overlay were produced from 84 linear inches of strip electrode and 12 linear inches of barrier strip. 1.4 pounds of strip electrode and 0.35 pound of barrier strip produced 1.75 pounds of weld metal. This involves depositing 96 pounds per hour.

Example 9

A depression was formed underneath the barrier strip in Example 1. The depression was 2 inches wide and ⅛ inch deep. Overlaying was accomplished successfully at 1000 amperes current, D.C. reverse polarity at a speed of 11 inches per minute. The weld metal completely filled the void under the barrier strip and produced a substantially level overlay layer at the top.

It will be noted that in FIGURE 6 of the drawings herein, I have shown weld bead 123 and prospective weld bead 126 as having an appropriate filleted shape in those parts of their sides nearer the base metal, while in the other drawings showing weld beads, such as FIGURES 14 and 15 with their showings of weld bead 123 (and see also for example FIGURES 20 and 21), the showing of the weld bead is of a diagrammatic nature not attempting to specifically show this particular aspect.

In view of my invention and disclosure variations and modifications to meet individual whim or particular need will doubtless become evident to others skilled in the art to obtain all or part of the benefits of my invention without copying the process, machine and composition shown, and I therefore claim all such insofar as they fall within the reasonable spirit and scope of my claims.

Having thus described my invention, what I claim as new and desire to secure by Letters Patent is:

1. A process of overlay welding on a base metal which has welded thereto a previous overlay weld bead extending lengthwise along one surface of the base metal, which comprises laying down a consumable barrier strip adjoining the edge of the previous weld bead and against the surface of the base metal, said barrier strip being wider than it is thick and the thickness of the barrier strip extending transversely to the surface of the base metal, arcing from a strip electrode which is wider than it is thick and which overhangs the barrier strip and overhangs the edge of the previous weld bead, to a weld pool formed by melting all of the barrier strip, all of the strip electrode, the edge of the previous weld bead and the surface of the base metal, and advancing the strip electrode in the direction of its thickness lengthwise of the barrier strip and the adjoining edge of the previous weld bead.

2. A process of claim 1, in which the strip electrode is wider than the barrier strip.

3. A process of claim 1, in which the barrier strip is thicker than the strip electrode.

4. A process of claim 1, which comprises feeding the barrier strip toward the weld pool at a rate greater than the rate of progression of the weld pool.

5. A process of claim 1, in which the barrier strip has at the edge of the previous weld bead a flange protruding toward the strip electrode.

6. A process of claim 1, which comprises depositing on the surface of the barrier strip an adhering layer of flux prior to laying down the barrier strip against the base metal.

7. A process of claim 1, which comprises decarburizing the work prior to the completion of arcing.

8. A process of claim 1, which comprises forming on the surface of the base metal an adhering decarburizing flux layer prior to laying down the barrier strip against the surface of the base metal.

9. A process of depositing overlay welding on a curved surface of a shell or the like of closed configuration which has welded thereto a previous overlay weld bead extending circumferentially on a curved surface of the shell, which comprises positioning the shell with its axis generally horizontal but inclined to the horizontal at an angle of ½ to 10° with the side having the previous weld bead lower, laying down a barrier strip adjoining the edge of the previous weld bead and against the curved surface of the shell, said barrier strip being wider than its thickness, the thickness of the barrier strip extending transversely to the curved surface of the shell, arcing from a strip electrode which is wider than its thickness, which overhangs the barrier strip and overhangs the edge of the previous weld bead, to a weld pool adjacent the curved surface of the shell, formed by melting all of the barrier strip, all of the strip electrode, the edge of the previous weld bead and the surface of the shell, and rotating the shell about its axis and thus relatively advancing the strip electrode in the direction of its thickness lengthwise of the barrier strip and the adjoining edge of the previous weld bead.

10. A process of claim 9, which comprises arcing to a relatively lower portion of the curved surface of the shell at a point located on the circumference between ¼ and 3° rearwardly (with respect to the direction of rotation) of a point vertically in line with the axis.

11. A process of overlay welding on the curved surface of a metal shell, which comprises positioning the shell on a generally horizontal axis, laying down a barrier strip against said curved surface of the shell, said barrier strip being wider than its thickness, the thickness of the barrier strip extending transversely to the surface of the shell, said barrier strip extending circumferentially on the curved surface of the shell, arcing from a strip electrode which is wider than its thickness, and which overhangs the barrier strip to a weld pool formed by melting all of the barrier strip, all of the strip electrode and the surface of the base metal, said arcing taking place at a point on said curved surface of the shell located between ¼ and 3° on the circumference rearwardly, with respect to the direction of rotation, of a point vertically in line with the axis, and rotating the shell and thereby relatively advancing the strip electrode with respect to the shell, said strip electrode relatively advancing in the direction of its thickness and lengthwise of the barrier strip.

12. In mechanism for overlay welding on base metal having a previous weld bead, means for laying down on a surface of the base metal, adjoining the edge of the previous weld bead, a barrier strip which is wider than its thickness, the thickness being disposed transverse to the surface of the base metal, means for feeding a strip electrode toward the barrier strip and the adjoining edge of the previous weld bead, said strip electrode being wider than it is thick and the thickness being disposed in the general direction of the length of the barrier strip, means for arcing between said strip electrode and a weld pool formed by melting all of said carrier strip, said strip electrode, the adjoining edge of the previous weld bead, and the surface of the base metal, and means for progressing said strip electrode and weld pool longitudinally of the barrier strip and of the previous weld bead.

13. Welding mechanism of claim 12, in which the strip electrode is wider than the barrier strip.

14. Welding mechanism of claim 12, in which the barrier strip is thicker than the strip electrode.

15. Welding mechanism of claim 12, in combination with means for feeding the barrier strip toward the arc at a rate greater than the rate of progression of the arc.

16. In mechanism for overlay welding on a curved surface of a shell or the like having a previous weld bead extending circumferentially around the shell, means for positioning the shell with its axis generally horizontal but inclined ½ to 10° from the horizontal with the side having the previous weld bead located lower, means for laying down on the curved surface of the shell adjoining the edge of the previous weld bead and extending circumferentially of the shell, barrier strip which is wider than its thickness, the thickness being disposed transverse to the surface of the shell, means for feeding a strip electrode toward the barrier strip and the adjoining edge of the previous weld bead, said strip electrode being wider than its thickness, the thickness being disposed in the general direction of the length of the barrier strip, means for arcing between said strip electrode and a weld pool formed by melting all of said barrier strip, said strip electrode, the adjoining edge of the previous weld bead and the surface of the shell, and means for rotating said shell for progressing said strip electrode and weld pool longitudinally of the barrier strip and of the previous weld bead.

17. Welding mechanism of claim 16, in which the arc is located between ¼ and 3° on the circumference of the shell rearward of a point vertically in line with the axis with respect to the direction of progression of the shell.

18. In mechanism for overlay welding on a curved surface of a shell, or the like, having a circumferentially extending previous weld bead, means for supporting the shell on a generally horizontal axis, means for laying down on the curved surface of the shell, adjoining the edge of the previous weld bead, a barrier strip which is wider than its thickness, the thickness being disposed transverse to the curved surface of the shell, means for feeding a strip electrode toward the barrier strip and the adjoining edge of the previous weld bead, said strip electrode being wider than its thickness, the thickness being disposed in the general direction of the length of the barrier strip, means for arcing between said strip electrode and a weld pool formed by melting all of said barrier strip, said strip electrode, the adjoining edge of the previous weld bead and the curved surface of the shell, said pool being located at a point rearward in the direction of progression of the shell between ¼ and 3° on the circumference from a point vertically in line with the axis, and means for rotating the shell and thereby progressing the strip electrode and the weld pool relatively longitudinally of the barrier strip and of the previous weld bead.

19. A process of depositing an overlay of weld metal on a base metal, which comprises laying down a consumable metallic barrier strip against one surface of the base metal, maintaining an electric arc between a strip electrode and a weld pool formed by melting the strip electrode, all of the barrier strip and a portion of the base metal, said strip electrode having a relatively short cross-sectional dimension and a relatively long cross-sectional dimension, relatively progressing the strip electrode and the arc in the general direction of said relatively short cross-sectional dimension and in the direction of the length of said barrier strip, and concurrently progressing the barrier strip toward the weld pool at a rate greater than the rate of progression of the strip electrode (as distinguished from the rate of electrode feed).

20. A process of depositing an overlay of weld metal on a base metal, which comprises applying an adhering flux layer to the base metal, subsequently laying down a consumable barrier strip against one surface of the base metal, maintaining an electric arc between a strip electrode and a weld pool formed by melting the strip electrode, all of the barrier strip and a portion of the base metal, said strip electrode having a relatively short cross-sectional dimension and a relatively long cross-sectional dimension, and relatively progressing the strip electrode and the arc in the general direction of said relatively short cross-sectional dimension and in the direction of the length of the barrier strip.

21. A process of depositing an overlay of weld metal on a base metal, which comprises laying down a consumable metallic barrier strip against one surface of the base metal, maintaining an electric arc between a strip electrode and a weld pool formed by melting the strip electrode, all of the barrier strip and a portion of the base metal, said strip electrode having a relatively short cross-sectional dimension and a relatively long cross-sectional dimension, decarburizing the work to an appreciable depth prior to completion of arcing, and relatively progressing the strip electrode and the arc in the general direction of said relatively short cross-sectional dimension and in the direction of the length of said barrier strip.

22. A process of depositing an overlay of weld metal on a base metal, which comprises applying to the surface of the base metal a decarburizing compound, subsequently laying down a consumable metal barrier strip against one surface of the base metal, maintaining an electric arc between a strip electrode and a weld pool formed by melting the strip electrode, all of the barrier strip and a portion of the base metal, said strip electrode having a relatively short cross-sectional dimension and a relatively long cross-sectional dimension, and relatively progressing the strip electrode and the arc in the general direction of said relatively short cross-sectional dimension and in the direction of the length of the barrier strip.

References Cited by the Examiner

UNITED STATES PATENTS

| | | | |
|---|---|---|---|
| 405,345 | 6/1889 | Coffin | 219—137 |
| 1,604,181 | 10/1922 | Lincoln | 219—137 |
| 1,749,765 | 3/1930 | Hendrickson | 219—74 |
| 1,977,128 | 10/1934 | Hawkins | 219—145 |
| 1,999,888 | 4/1935 | Ammann | 29—182.3 |
| 2,121,194 | 6/1938 | Hardy | 29—182.5 |
| 2,137,471 | 11/1938 | Zublim | 219—145 |
| 2,191,469 | 2/1940 | Hopkins | 117—50 |
| 2,427,350 | 9/1947 | Carpenter et al. | 219—76 |
| 2,490,023 | 12/1949 | Bernard | 219—146 |
| 2,511,976 | 6/1950 | Frost | 219—73 |
| 2,848,593 | 8/1958 | Neuman et al. | 219—73 |
| 2,927,990 | 3/1960 | Johnson | 219—73 |
| 3,016,452 | 1/1962 | Wilcox | 219—146 |
| 3,051,822 | 8/1962 | Bernard et al. | 219—74 |
| 3,056,190 | 10/1962 | Chisholm et al. | 29—182.3 |
| 3,073,948 | 1/1963 | Johnson | 219—137 |
| 3,179,787 | 4/1965 | Wasserman et al. | 219—146 |

RICHARD M. WOOD, *Primary Examiner.*